United States Patent

Yano et al.

[15] 3,665,098

[45] May 23, 1972

[54] UNIT FOR CONTROLLING TENSION OF MAGNETIC TAPE

[72] Inventors: Osahiko Yano, Kadoma; Takahiro Nakamura, Neyagawa; Toshiomi Yabu, Kyoto, all of Japan

[73] Assignee: Matsushita Electric Industrial Co., Ltd., Osaka, Japan

[22] Filed: Oct. 7, 1970

[21] Appl. No.: 78,857

[30] Foreign Application Priority Data

Oct. 14, 1969 Japan....................................44/82452

[52] U.S. Cl. ................178/6.6 P, 179/100.2 S, 340/174.1 A

[51] Int. Cl.........................................G11b 15/43, H04n 5/78

[58] Field of Search................178/6.6 A, 6.6 P; 179/100.2 S; 340/174.1 A, 174.1 B, 174.1 P

[56] References Cited

UNITED STATES PATENTS

| | | | |
|---|---|---|---|
| 3,535,441 | 10/1970 | Grace | 178/6.6 P |
| 3,402,350 | 9/1968 | Shellabarger | 179/100.2 S |
| 3,399,334 | 8/1968 | MacLeod | 178/6.6 P |
| 3,213,193 | 10/1965 | Konishi | 178/6.6 P |

*Primary Examiner*—Howard W. Britton

*Attorney*—Stevens, Davis, Miller & Mosher

[57] ABSTRACT

A unit for controlling the tension of a magnetic tape in which an output of a self-oscillator is recorded on and reproduced from a magnetic tape whose tension is to be controlled, and the phase difference between the reproduced signal and an outside reference signal is detected to control the rotational torque of a tape-feed reel in response to the detected phase difference, whereby the tension of the magnetic tape is kept constant.

10 Claims, 1 Drawing Figure

Patented May 23, 1972 3,665,098
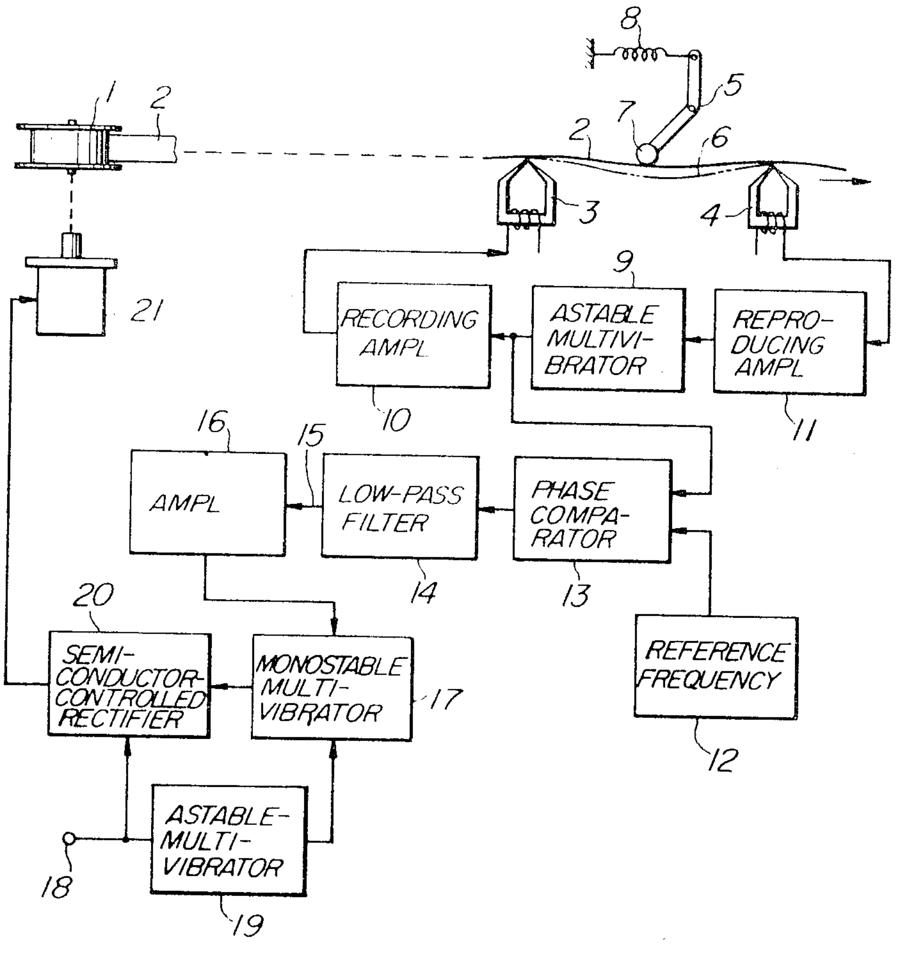
O. YANO,
T. NAKAMURA &
T. YABU INVENTORS
BY Stevens, Davis, Miller & Mosher
ATTORNEYS

UNIT FOR CONTROLLING TENSION OF MAGNETIC TAPE

This invention relates to a unit for controlling the tension of a magnetic tape running in a magnetic recording and reproducing apparatus to automatically maintain the tension of the magnetic tape constant.

Conventional magnetic tape tension controlling devices are provided with a swingable tension arm which is equipped at its one end with a pin in pressure contact with a running magnetic tape. A turning force of the tension arm accompanying the variation in the tension of the magnetic tape is transferred to a tape feed reel to control the torque of the feed reel.

In other words, the variation of the tape tension is mechanically detected from an angle deviation of the arm, which mechanical variation is transmitted to a driving mechanism for a tape-feeding reel, thereby controlling the tape tension.

Consequently, this results in not only a complicated mechanical construction, but it also has difficulties in highly precise control, and also derives a mechanical restriction for the position to detect the tape tension which must be converted to the angle position of the detecting arm to be mechanically transmitted to the driving mechanism of the feed-reel.

An object of the present invention is to solve the above problems and provide a control means wherein the variation of the tape tension is detected electrically as a variation in frequency (phase), and the detected electric signal is applied for controlling the tape tension, thereby affording a high precision control.

Another object of this invention is to provide a means to control the tape tension in accordance with an outside reference signal.

A further object of this invention is to provide a control means whose structure is not affected from the relative position between the mechanism for driving the feed-reel to be controlled and the tension detecting.

The above and other objects and features will be clarified from the undermentioned description in conjunction with the accompanying drawing in which:

The sole FIGURE is a block diagram showing an electrical system in an embodiment according to the invention.

In the FIGURE, a magnetic recording tape 2 is fed from a feed-reel 1 by means of a driving mechanism such as a capstan (not shown) in the direction of the arrow.

Two magnetic heads 3 and 4 are disposed with a predetermined space, each being traced on the same track on the tape 2.

The magnetic tape 2 is supplied with a suitable force at its center position between the two heads 3 and 4 from a roller 7 fitted on an end of an arm 6 which is supported to allow for its swinging action on a fulcrum 5.

In the above mechanism, a tension variation on the feed-reel 1, for example, a tension reduction below a predetermined value, causes the tape 2 to run along the passage shown by the broken line by the force of a spring 8.

When the tension is increased, the passage of the tape is varied to the opposite side.

In other words, the provision is designed in such a manner that the tape length between the magnetic heads 3 and 4 varies according to a variation in tension.

A rectangular wave output signal of a self-oscillating astable-multivibrator 9 is recorded through a recording amplifier on the magnetic tape 2 with its magnetic saturation.

Distances between the two heads 3 and 4, tape running speed and the oscillating frequency of the multivibrator are so arranged that the signal recorded on the tape by the head 3 is reproduced by the head 4 and the reproduced pulse signal is supplied through a reproducing amplifier 11 to the multivibrator for its triggering, with a result that the tape is recorded with a sequence of pulses spaced with intervals according to the variation of the tape length between both heads.

With these arrangements, the frequency of the signal reproduced by the magnetic head 4, i.e., the frequency of the output signal from the astable-multivibrator 9 is varied according to a variation in length between the two heads derived from the tension variation of the tape.

Thus the tension variation of the tape can be detected from the frequency variation of the output signal of the multivibrator 9.

Consequently, by comparing the frequency of the multivibrator with a reference frequency of an external source 12, smoothing the output signal of the comparator 13, i.e., the error signal representing the frequency deviation, by a low-pass filter 14 and controlling the rotating force of the tape-feeding reel motor by the smoothed signal 15, the tension control unit can be provided with an extremely high sensibility.

In the above structure, the smoothed signal 15 is impressed through a DC amplifier 16, to the monostable multivibrator 17 to vary its time constant, while an AC signal 18 to drive the feed-reel driving motor 21, is supplied to the wave-shaping circuit 19, thereby producing a pulse signal synchronized with the AC signal 18, by which the monostable multivibrator 17 is triggered.

Accordingly, the pulse signal synchronized with the AC signal 18 and having a time interval between succeeding pulses proportional to the difference between both phases of the reference signal 12 and the astable-multivibrator 9 can be obtained as an output of the monostable multivibrator 17, which is fed to the gate of a semiconductor-controlled rectifier element 20 so that the firing angle of the controlled rectifier is controlled according to the smoothed signal 15, and the controlled current is supplied to the feed-reel driving motor 21. As each cycle of the current is controlled so as to have a conductive period varying according to the phase difference between both output signals of the reference signal 12 and the astable-multivibrator 9, the rotating torque of the electric motor 21 is also controlled according to the variation.

As this electric motor 21 is connected to the feed-reel 1, a closed circuit servo system is formed in this unit, whereby the tape tension exerted in the direction opposite to the tape running is controlled according to the phase difference, i.e., the control is so arranged that the reference signal 12 has a specified phase relation with respect to the output of the multivibrator 9.

In other words, the control is arranged in such a manner that the tape length between two heads 3 and 4 is maintained at a predetermined value depending on the reference signal 12 and the spring force 8.

Accordingly, when the reference signal 12 consisting of a variable oscillator is adjusted to produce a given frequency of the output signal, the tape is controlled to be applied with a tension corresponding to the output of the oscillator.

Further, in the case of a magnetic video recording and reproducing unit for a television signal, the vertical synchronizing signal in the video signal or a signal derived therefrom can conveniently be used for the purpose.

Furthermore, in the above embodiment, the firing angle of the ac signal, i.e., the driving source for the motor, was controlled by the output from the phase comparator, but it may also be sufficient to control in such a manner that a braking force is applied to the tape-feed reel by an electromagnetic brake depending on the output signal of the phase comparator. It is to be noted that still other modifications may be made by those skilled in the art.

What we claim is:

1. A unit for controlling tension of magnetic tape comprising: a magnetic recording tape being fed from a feed-reel by a driving means, a first and second magnetic heads being spaced with a predetermined distance from each other on the passage of said magnetic tape so as to be in contact therewith, means for exerting a force on a portion of said magnetic tape between both heads transversely of its running direction, a self-oscillator for supplying a recording signal to said first magnetic head disposed at the forward position of the running tape relative to the second head, means for driving said self-oscillator synchronizing with a signal reproduced output of by said second head from said recorded signal a phase comparator means for comparing said reproduced signal with phase of a reference signal and means for controlling the rotating torque of said feed-reel according to the output of said comparator.

2. A unit for controlling tension of magnetic tape according to claim 1, wherein said reference signal is a signal corresponding to a synchronizing signal in a video signal to be recorded on said tape.

3. A unit for controlling tension of magnetic tape according to claim 1, wherein said reference signal is an output of a variable oscillator.

4. A unit for controlling tension of magnetic tape according to claim 1, wherein an ac signal supplied to said driving means for the feed-reel is controlled in such a manner that each cycle thereof has a conductive period corresponding to an output signal of a monostable multivibrator, said multivibrator being controlled to have a time constant corresponding to the output of said phase comparator.

5. Apparatus for controlling tension of a magnetic tape, comprising:

a feed reel carrying a magnetic tape;

first and second magnetic head means for recording a signal on and reproducing said signal from said magnetic tape spaced apart a predetermined distance from each other;

driving means driving said magnetic tape from said feed reel past said first and second magnetic head means and in contact therewith;

tensioning means for applying tension to said magnetic tape in the direction of movement of said tape past said first and second magnetic head means;

distance changing means for changing the effective distance between said first and second magnetic head means as measured along said magnetic tape in the direction of movement of said tape past said first and second magnetic head means as a function of the tension applied to said tape by said tensioning means;

first signal generating means for generating a signal and recording said signal on said magnetic tape through said first magnetic head means;

means connecting said second magnetic head means to an input of said first signal generating means to apply the signal recorded on said magnetic tape through said first head means and reproduced by said second magnetic head means to said first signal generating means to control the frequency of the signal generated by said first signal generating means;

second signal generating means generating a reference signal of a predetermined frequency;

comparator means for comparing the frequency of said reference signal with the frequency of said signal generated by said first signal generating means and deriving a resultant error signal; and controlling means controlling said driving means by said resultant error signal.

6. Apparatus according to claim 5, wherein said distance changing means comprises means for exerting a force on the portion of said magnetic tape between said first and second magnetic head means transversely of the direction of movement of said magnetic tape past said first and second magnetic head means.

7. Apparatus according to claim 5, wherein said controlling means comprises: a pulse generator having the characteristics of a monostable multivibrator; and means applying said resultant error signal to said pulse generator to control the duration of the pulses produced by said pulse generator.

8. Apparatus according to claim 7, wherein said controlling means further comprises:

AC signal supply means supplying an AC signal to said driving means;

further pulse generating synchronized pulses synchronized with said AC signal, said AC signal supply means being connected to an input of said further pulse generating means; and means applying an output of said further pulse generating means to an input of the first mentioned pulse generating means to trigger the operation of said first mentioned pulse generating means.

9. Apparatus according to claim 8, wherein said controlling means further comprises: switching means connected in series between said AC signal supply means and said driving means; and means applying an output of said first mentioned pulse generating means to said switching means to control the supply of said AC signal through said switching means to said driving means.

10. Apparatus according to claim 9, wherein said switching means comprises a semiconductor controlled rectifier having a gate electrode, the output of said first mentioned pulse generating means being connected to said gate electrode to control the flow of said AC signal through said controlled rectifier.

* * * * *